US012591061B2

(12) United States Patent
Wakamiya

(10) Patent No.: US 12,591,061 B2
(45) Date of Patent: Mar. 31, 2026

(54) OBJECT RECOGNITION SYSTEM AND OBJECT RECOGNITION METHOD

(71) Applicant: TOYOTA JIDOSHA KABUSHIKI KAISHA, Toyota (JP)

(72) Inventor: Hideyuki Wakamiya, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1094 days.

(21) Appl. No.: 17/649,905

(22) Filed: Feb. 3, 2022

(65) Prior Publication Data

US 2022/0268941 A1 Aug. 25, 2022

(30) Foreign Application Priority Data

Feb. 25, 2021 (JP) ................................. 2021-029162

(51) Int. Cl.
*G01S 17/89* (2020.01)
*G01S 17/10* (2020.01)
*G06V 20/58* (2022.01)

(52) U.S. Cl.
CPC .............. *G01S 17/89* (2013.01); *G01S 17/10* (2013.01); *G06V 20/58* (2022.01)

(58) Field of Classification Search
CPC ........ G01S 17/89; G01S 17/10; G01S 7/4802; G01S 2007/4975; G01S 2007/4977; G01S 7/497; G01S 17/931; G06V 20/58; G01N 21/94

See application file for complete search history.

(56) References Cited

U.S. PATENT DOCUMENTS

| | | | |
|---|---|---|---|
| 10,578,719 B2 * | 3/2020 | O'Keeffe | ................ G01S 17/42 |
| 10,675,945 B2 * | 6/2020 | Lombrozo | ................ G01L 7/20 |
| 10,901,092 B1 * | 1/2021 | Kantor | ................... H04N 23/56 |
| 11,550,044 B2 * | 1/2023 | Kudla | ................... G01S 7/4817 |
| 12,159,469 B2 * | 12/2024 | Miyazawa | ............ G01S 17/931 |
| 2019/0101629 A1 * | 4/2019 | Wakamiya | ............ G01S 13/931 |
| 2020/0201351 A1 * | 6/2020 | Armstrong-Crews | ....................... G01S 13/931 |
| 2020/0249354 A1 * | 8/2020 | Yeruhami | ............. G01S 7/4815 |
| 2021/0124960 A1 * | 4/2021 | Lee | ...................... G06N 3/0464 |
| 2021/0223374 A1 * | 7/2021 | Kudla | ..................... G01S 17/42 |

(Continued)

FOREIGN PATENT DOCUMENTS

| WO | 2020170679 A1 | 8/2020 |
|---|---|---|
| WO | 2022138111 A1 | 6/2022 |

*Primary Examiner* — Michelle M Iacoletti
*Assistant Examiner* — Maher Yazback
(74) *Attorney, Agent, or Firm* — Dickinson Wright, PLLC

(57) ABSTRACT

A data processing device performs an abnormality determination process in which i) a relative moving distance indicating a distance by which a tracking target moves relatively to a movable body is predicted, in a range of a data set for expressing point group data until the lapse of a predetermined time from a present timing, ii) the relative moving distance includes a vertical distance and a horizontal distance, iii) an estimated intensity of reflected light is calculated, when the vertical distance or the horizontal distance is equal to or longer than a predetermined distance, and iv) it is determined that there is an abnormality in the predetermined section when it is determined that a difference between the estimated intensity of the reflected light and an actual intensity of the reflected light is higher than a predetermined intensity.

6 Claims, 8 Drawing Sheets

(56) References Cited

U.S. PATENT DOCUMENTS

| | | | |
|---|---|---|---|
| 2021/0263153 A1* | 8/2021 | McWhirter | ............. G01S 17/89 |
| 2022/0126792 A1* | 4/2022 | Totsuka | ................ G01S 17/931 |
| 2022/0179057 A1* | 6/2022 | Shotan | .................. G01S 17/931 |
| 2024/0061092 A1* | 2/2024 | Namba | ................... G01S 7/497 |
| 2025/0085402 A1* | 3/2025 | Watson | ................... G01S 17/86 |

* cited by examiner

LID_OB2(X, Y, Z, IR)

(X1, Y1, Z1)

DR (t1)

LID_OB2(X, Y, Z, IR)   VE (X1, Y1, Z1)

DR (t2)

(X2, Y2, Z2)

VE

DR (t3)

(X2, Y2, Z2)

LID_OB2(X, Y, Z, IR)

DR (t1)

LID_OB2(X, Y, Z, IR)    IVE    PRS

DR (t2)

(Xp, Yq, Zr)
IR=IRE (Xi, Yj, Zk)

PRC

DR (t3)

(Xp, Yq, Zr)
IR=IRA

PRC

OBJECT RECOGNITION SYSTEM AND OBJECT RECOGNITION METHOD

CROSS-REFERENCE TO RELATED APPLICATION

This application claims priority to Japanese Patent Application No. 2021-029162 filed on Feb. 25, 2021, incorporated herein by reference in its entirety.

BACKGROUND

1. Technical Field

The disclosure relates to a system and a method for recognizing an object through the use of a laser imaging detection and ranging (LIDAR).

2. Description of Related Art

WO 2020/170679 discloses a sensor system that is equipped with outer covers of vehicle lighting fixtures, LIDARs stored in spaces formed inside the outer covers respectively, lighting fixture cleaners that remove the dirt that has adhered to the outer covers respectively, and a control unit that controls the driving of the cleaners for the vehicle lighting fixtures. In this conventional system, the vehicle lighting fixtures are arranged at four corners of a vehicle respectively. Each of the LIDARs outputs a laser pulse to an area around the vehicle, and detects reflected light of the laser pulse reflected at a reflection point. The control unit determines whether or not dirt such as rain, snow, and mud has adhered to the outer covers.

In the case where dirt has adhered to each of the outer covers, the intensity of the reflected light detected by the corresponding one of the LIDARs falls. In the determination made by the control unit, the intensity of the reflected light of the laser pulse reflected by a dry road surface around the vehicle is acquired. Then, when the intensity of this reflected light is equal to or lower than a predetermined threshold, it is determined that dirt has adhered to the outer cover. When it is determined that dirt has adhered to the outer cover, the control unit drives the corresponding one of the cleaners.

SUMMARY

However, in the conventional system that utilizes the reflected light reflected on the dry road surface, only the dirt that has adhered to a lower portion of the outer cover can be detected. That is, in the conventional system, the dirt that has adhered to portions other than the lower portion of the outer cover cannot be detected. The range of the laser pulse output from the LIDAR includes vertical and lateral directions of the vehicle. Therefore, with a view to holding the accuracy in detecting an object with the LIDAR low, the development of an art for detecting the dirt adhering to that range of the outer cover which is passed by the laser pulse and the reflected light is desired.

It is an object of the disclosure to provide an art capable of detecting an abnormality that has occurred in that range of a cover portion covering a main body portion of a LIDAR which is passed by a laser pulse from the main body portion.

The first aspect is an object recognition system that recognizes an object around a movable body, and has the following features. The object recognition system is equipped with a main body portion of a laser imaging detection and ranging, a cover surface, and a data processing device. The main body portion outputs a laser pulse to an area around the movable body and acquires data on a reflection point around the movable body by detecting reflected light of the laser pulse reflected at the reflection point. The cover surface protects the main body portion. The data processing device performs an object recognition process based on point group data obtained by processing the data on the reflection point. The cover surface includes a scan range indicating a range that is passed by the laser pulse and the reflected light. The data processing device further performs an abnormality determination process for determining whether or not there is an abnormality in a predetermined section of the scan range. The data processing device predicts a relative moving distance indicating a distance by which a tracking target recognized through the object recognition process moves relatively to the movable body, in a range of a data set for expressing the point group data until the lapse of a predetermined time from a present timing, based on a history of the point group data, in the abnormality determination process. The relative moving distance includes a vertical distance indicating a component that is perpendicular to an output central axis of the laser pulse and that is parallel to a vertical direction, and a horizontal distance indicating a component that is perpendicular to the output central axis and that is parallel to a horizontal direction. The data processing device calculates an estimated intensity of the reflected light based on a history of point group data constituting the tracking target, when the vertical distance or the horizontal distance is equal to or longer than a predetermined distance, in the abnormality determination process. The estimated intensity is an intensity of the reflected light that is predicted to constitute the point group data on the tracking target, in the range of the data set after the lapse of the predetermined time and in a corresponding section indicating a section corresponding to the predetermined section. The data processing device determines whether or not a difference between the estimated intensity and an actual intensity of the reflected light is higher than a predetermined intensity, in the abnormality determination process. The actual intensity is an intensity of the reflected light that actually constitutes the point group data on the tracking target, in the range of the data set after the lapse of the predetermined time and in the corresponding section. The data processing device determines that there is an abnormality in the predetermined section when it is determined that the difference between the estimated intensity and the actual intensity is higher than the predetermined intensity, in the abnormality determination process.

The first aspect may have the following features as a second modified configuration. The data processing device further performs a process of setting the corresponding section based on the history of the point group data constituting the tracking target, in the abnormality determination process. The data processing device sets the corresponding section as a section inside a section that is predicted to constitute point group data on an outer edge portion of the tracking target, in the range of the data set after the lapse of the predetermined time, in the process of setting the corresponding section.

The first aspect may have the following features as a third modified configuration. The data processing device further performs a process of specifying a specific section indicating a section that is predicted to coincide with the corresponding section in the range of the data set after the lapse of the predetermined time, in the range of the data set at the present timing, and a process of selecting arbitrary data in the specific section and evaluating an intensity of the reflected light constituting the arbitrary data, in the abnormality determination process. The data processing device calculates an average of intensities of the reflected light constituting all the data in the specific section respectively, determines whether or not a difference between the average and the intensity of the reflected light constituting the selected arbitrary data is larger than a predetermined deviation, and selects data other than the selected arbitrary data when it is determined that the difference between the average and the intensity of the reflected light constituting the selected arbitrary data is larger than the predetermined deviation, in the process of evaluating the intensity of the reflected light.

The fourth aspect is an object recognition method, and has the following features. The object recognition method is carried out by a data processing device. The data processing device performs an object recognition process based on data on a reflection point around the movable body that are acquired by detecting reflected light of a laser pulse reflected at the reflection point. The data processing device performs an abnormality determination process for determining whether or not there is an abnormality in a predetermined section of a scan range indicating a range that is passed by the laser pulse and the reflected light, on a cover surface that protects a main body portion of a laser imaging detection and ranging that outputs the laser pulse, that detects the reflected light, and that acquires the data on the reflection point. The data processing device predicts a relative moving distance indicating a distance by which a tracking target recognized through the object recognition process moves relatively to the movable body, in a range of a data set for expressing the point group data until the lapse of a predetermined time from a present timing, based on a history of the point group data, in the abnormality determination process. The relative moving distance includes a vertical distance indicating a component that is perpendicular to an output central axis of the laser pulse and that is parallel to a vertical direction, and a horizontal distance indicating a component that is perpendicular to the output central axis and that is parallel to a horizontal direction. The data processing device calculates an estimated intensity of the reflected light based on a history of point group data constituting the tracking target, when the vertical distance or the horizontal distance is equal to or longer than a predetermined distance, in the abnormality determination process. The estimated intensity is an intensity of the reflected light that is predicted to constitute the point group data on the tracking target, in the range of the data set after the lapse of the predetermined time and in a corresponding section indicating a section corresponding to the predetermined section. The data processing device determines whether or not a difference between the estimated intensity and an actual intensity of the reflected light is higher than a predetermined intensity, in the abnormality determination process. The actual intensity is an intensity of the reflected light that actually constitutes the point group data on the tracking target, in the range of the data set after the lapse of the predetermined time and in the corresponding section. The data processing device determines that there is an abnormality in the predetermined section when it is determined that the difference between the estimated intensity and the actual intensity is higher than the predetermined intensity, in the abnormality determination process.

According to the first or fourth aspect, the data processing device performs the abnormality determination process for determining whether or not there is an abnormality in the predetermined section of the scan range. According to the abnormality determination process, the estimated intensity of the reflected light is calculated based on the history of the point group data obtained by processing the data on the reflection point. Besides, according to the abnormality determination process, when it is determined that the difference between the estimated intensity of the reflected light and the actual intensity of the reflected light is higher than the predetermined intensity, it is determined that there is an abnormality in the predetermined section. Accordingly, the abnormality that has occurred in the scan range can be detected.

The section that is predicted to constitute the point group data on the outer edge portion of the tracking target may include the data on the object other than the tracking target. In this respect, according to the second modified configuration, the corresponding section can be set as the section inside the section that is predicted to constitute the point group data on the outer edge portion of the tracking target. Accordingly, the accuracy in detecting the abnormality that has occurred in the scan range can be enhanced by enhancing the accuracy in calculating the estimated intensity of the reflected light.

In the case where the arbitrary data in the specific section are selected, the intensity of the reflected light constituting the selected arbitrary data may significantly deviate from the intensity of the reflected light therearound. In this respect, according to the third modified configuration, the average of the intensities of the reflected light constituting all the data in the specific section respectively is calculated. Besides, when it is determined that the difference between this average and the intensity of the reflected light constituting the selected arbitrary data is larger than the predetermined deviation, data other than the arbitrary data are selected. Accordingly, the accuracy in detecting the abnormality that has occurred in the scan range can be enhanced by appropriately selecting the arbitrary data in the specific section.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An object recognition system according to one of the embodiments of the disclosure will be described hereinafter with reference to the drawings. Incidentally, an object recognition method according to the embodiment is realized through computer processing performed in the object recognition system according to the embodiment. Besides, in each of the drawings, like or equivalent components and elements are denoted by like reference symbols, and the description thereof will be simplified or omitted.

1. Outline of Embodiment 1-1. Object Recognition Through Use of Lidar

Figure 1:
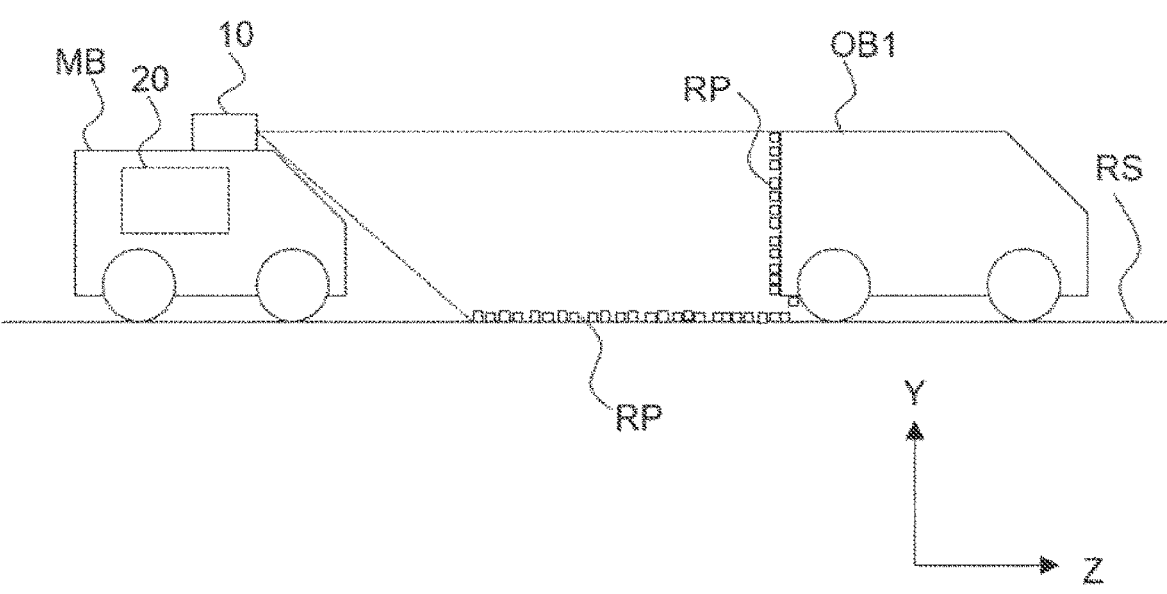
FIG. 1 is a view illustrating an example of object recognition through the use of a LIDAR.

FIG. 1 is a view illustrating an example of object recognition through the use of a LIDAR. In FIG. 1, a movable body MB is depicted. The movable body MB shown in FIG. 1 is a vehicle. It should be noted, however, that the movable body MB may be a robot, a marine movable body, or a flying body. As the robot, a logistics robot and a working robot are exemplified. As the marine movable body, a ship and a submarine are exemplified. As the flying body, an airplane, a drone, and the like are exemplified.

The movable body MB is mounted with a 3D LIDAR 10. The 3D LIDAR 10 outputs a laser pulse to an area around the movable body MB. When the laser pulse is reflected at a reflection point RP around the movable body MB, reflected light of the laser pulse returns to the 3D LIDAR 10. The 3D LIDAR 10 obtains data on the reflection point RP by detecting this reflected light.

In FIG. 1, a road surface RS on which the movable body MB runs is depicted. When the reflected light of the laser pulse reflected at the reflection point RP on the road surface RS is detected by the 3D LIDAR 10, data on the reflection point RP are obtained. In FIG. 1, an object OB1 present in front of the movable body MB is also depicted. The object OB1 shown in FIG. 1 is a vehicle. The object OB1 may move or remain stopped. When the reflected light of the laser pulse reflected at another reflection point RP on the object OB1 is detected by the 3D LIDAR 10, data on the reflection point RP are obtained.

The data on the reflection point RP include, for example, data on output angles (a horizontal angle $\theta$ and a vertical angle $\phi$) of the laser pulse, and data on a time of flight (TOF) of the laser pulse at these output angles. When the data on the reflection point RP are processed, point group data LID are obtained. Individual data constituting the point group data LID include 3D position data (i.e., X-position data, Y-position data, and Z-position data) in a sensor coordinate system fixed to the 3D LIDAR 10, and data on an intensity IR of reflected light.

The movable body MB is also mounted with a data processing device 20. The data processing device 20 performs "an object recognition process" for recognizing an object around the movable body MB based on the point group data LID. In the object recognition process, an object as a tracking target is recognized. As the tracking object in the case where the movable body MB is a vehicle, another movable body, a road sign, a road surface, a roadside object, and a fallen object are exemplified. The object is recognized through a clustering process. The clustering process is a process of grouping point group data that are similar in reflection characteristics to one another into a plurality of clusters based on the point group data LID. The method of recognizing the object including the clustering process is not limited in particular, and a known technology can be applied.

1-2. Abnormality Determination Process

Figure 2:
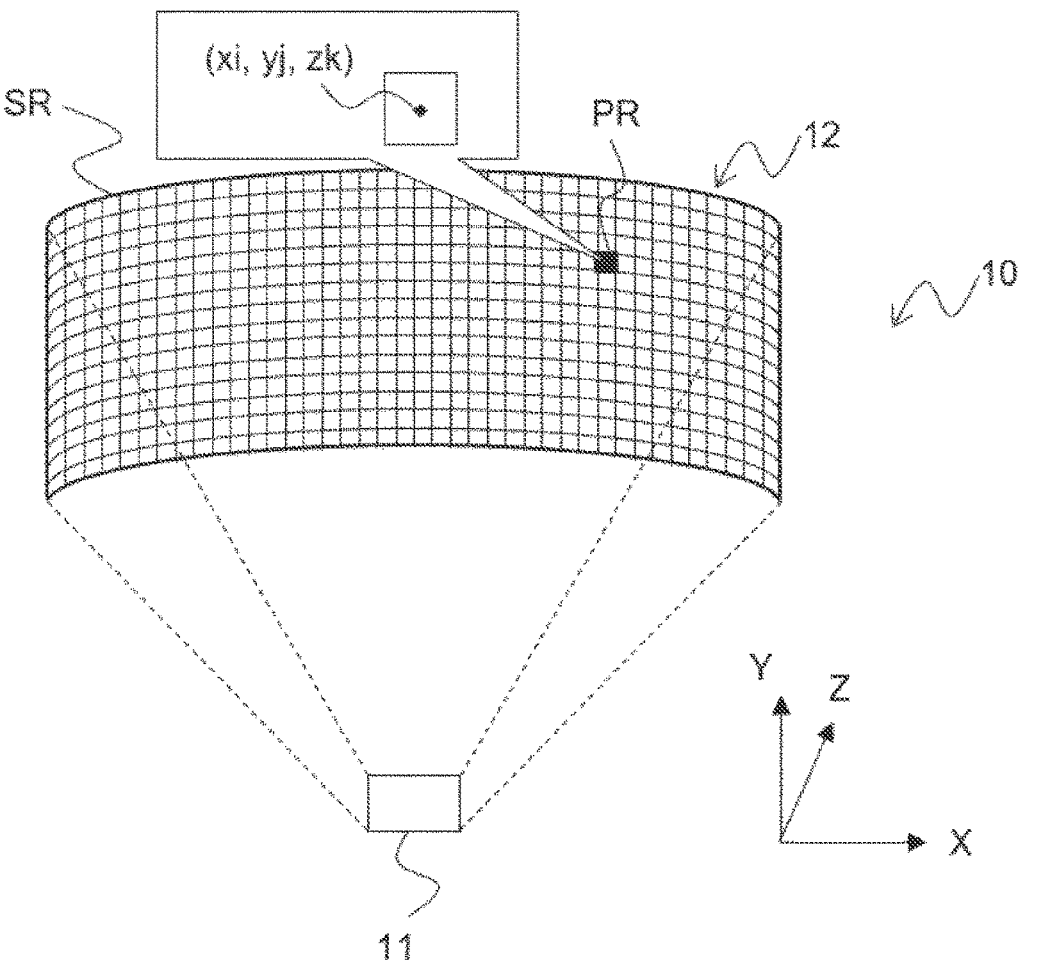
FIG. 2 is a schematic view showing a configuration example of a 3D LIDAR.

FIG. 2 is a schematic view showing a configuration example of the 3D LIDAR 10. In the example shown in FIG. 2, the 3D LIDAR 10 is equipped with a main body portion 11 and a cover portion 12. The main body portion 11 outputs a laser pulse, detects reflected light of the laser pulse, and processes data on the reflection point RP. The cover portion 12 is provided for the purpose of protecting the main body portion 11. The cover portion 12 includes a cover surface covering an outer periphery of the main body portion 11. In FIG. 2, as part of the cover surface, a range (hereinafter referred to as "a scan range" as well) SR that is passed by the laser pulse and the reflected light is depicted.

Since the cover portion 12 is exposed to outside air, dirt such as rain, snow, and mud adheres to the cover surface. Besides, the cover surface is damaged through contact with a flying object such as a small stone. When dirt adheres to the scan range SR or the scan range SR is damaged, the accuracy of the data on the reflection point RP falls, and hence the accuracy in recognizing the object based on the point group data LID falls. Thus, in the embodiment, "an abnormality determination process" for determining whether or not there is an abnormality in the scan range SR is performed.

In the abnormality determination process, it is determined whether or not there is an abnormality in a predetermined section PR in the scan range SR. The predetermined section PR is defined based on a unit section obtained in dividing the scan range SR into N sections. The unit section may be constituted by a single section or an assembly of two or more sections. The position of a center of the predetermined section PR is expressed by, for example, a coordinate (xi, yj, zk) on a coordinate system that is identical in type to the foregoing sensor coordinate system. A Z-axis in this case is an output central axis of the laser pulse, and is parallel to a horizontal direction. Besides, a Y-axis is perpendicular to the Z-axis, and is parallel to a vertical direction. An X-axis is perpendicular to the Z-axis and the Y-axis.

The range of the output of the laser pulse coincides with the scan range SR. Besides, the reflected light of the laser pulse passes the scan range SR. Accordingly, it is safe to conclude that a range DR of a data set for expressing the point group data LID is similar in shape to the scan range SR. Thus, the data set range DR is divided into N sections as is the case with the scan range SR. Then, a section (hereinafter referred to as "a corresponding section" as well) PRC corresponding to the predetermined section PR in the scan range SR can be determined in the data set range DR.

Figure 3:
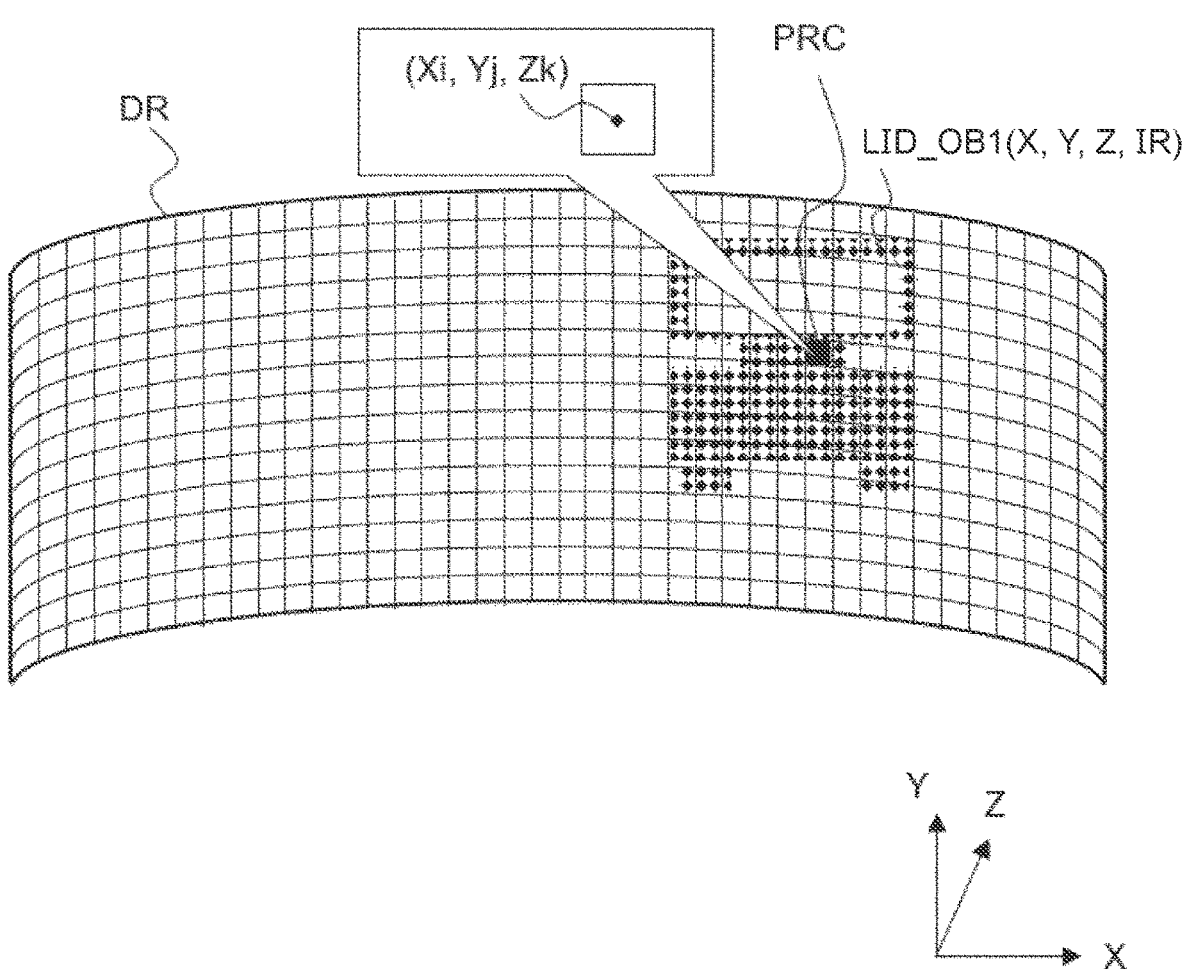
FIG. 3 is a view schematically showing a data set range for expressing point group data, and a corresponding section defined in this data set range as a section corresponding to a range that is passed by a laser pulse and reflected light.

FIG. 3 is a view schematically showing the data set range DR and the corresponding section PRC. As described already, the data set range DR is similar in shape to the scan range SR. Besides, the data set range DR is divided into N sections. Therefore, when the position of the center of the predetermined section PR is expressed by the coordinate (xi, yj, zk), the position of a center of the corresponding section PRC is expressed by a coordinate (Xi, Yj, Zk).

In FIG. 3, point group data LID_OB1 (X, Y, Z, IR) obtained by processing data on the reflection point RP on the object OB1 shown in FIG. 1 are also depicted. The point group data LID_OB1 (X, Y, Z, IR) are constituted of the 3D position data (i.e., the X-position data, the Y-position data, and the Z-position data) in the foregoing sensor coordinate system, and individual data LID (X, Y, Z, IR) including the data on the reflected light intensity IR. The X-position data and the Y-position data that are included in each of the data LID (X, Y, Z, IR) represent data on the X and Y coordinates of the data LID (X, Y, Z, IR) in the data set range DR. On the other hand, the Z-position data included in each of the data LID (X, Y, Z, IR) represent data on a distance DS from the movable body MB (the main body portion 11) to the reflection point RP.

The reflected light intensity IR will now be described. The reflected light intensity IR is calculated based on, for example, an electric power Pr received by the LIDAR in an equation (1) shown below.

$$Pr = \frac{PtGtA}{(4\pi R^2)(2\pi R^2)}\left(TtTr\left(\sum(S\sigma)\right)\prod(L)\right) + \sum N \qquad (1)$$

In the first term on the right side of the equation (1), Pt denotes a transmitted electric power, Gt denotes a coefficient regarding the directivity (extension) of transmission, and R denotes a distance from a light source to the reflection point RP. Tt denotes a transmissivity of a transmission portion, Tr denotes a transmissivity of a reception portion, and L denotes a coefficient regarding space attenuation. The second term on the right side of the equation (1) represents noise N.

As is apparent from the equation (1), the reflected light intensity IR is inversely proportional to the fourth power of the distance R. Therefore, when the variables other than the distance R in the first term on the right side of the equation (1) are regarded as constant and the second term is assumed to be negligible, the reflected light intensity IR can be expressed based on the distance R (i.e., the distance DS).

In the abnormality determination process, a moving direction and a moving distance of the tracking target in the data set range DR in the future are predicted based on a history of the point group data LID constituting the tracking target. In the present specification, "the moving direction in the future" is defined as a direction in which the tracking target moves relatively to the movable body MB in the data set range DR until the lapse of a predetermined time from the present timing. "The moving distance in the future" is defined as a distance by which the tracking target moves in the moving direction in the future in the data set range DR until the lapse of the predetermined time from the present timing.

Figure 4:
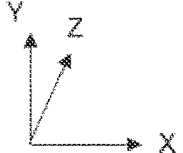
FIG. 4 is a view illustrating an example of a method of predicting a moving direction and a moving distance of a tracking target in the data set range in the future.

An example of a method of predicting the moving direction and the moving distance of the tracking target in the data set range DR in the future will be described with reference to FIG. 4. In FIG. 4, point group data LID constituting an object OB2 as the tracking target is depicted in a simplified manner. The object OB2 shown in FIG. 4 is a vehicle stopped on a road shoulder located ahead and on the right side of a lane in which the movable body MB runs.

In FIG. 4, the data set range DR at timings t1 to t3 are also depicted in a time-series manner. Incidentally, the description of FIG. 4 is premised on the following. First of all, the present timing is the timing t2, and the tracking of the object OB2 has already been started at the timing t1. Secondly, between the timing t1 and the timing t2, the movable body MB travels straight in the lane and gradually approaches the object OB2. That is, between the timing t1 and the timing t2, a relative speed Vrz at which the movable body MB moves relatively to the object OB2 in the Z-axis direction is constant. Thirdly, the timing t3 is a timing in the future, and a time difference between the timing t2 and the timing t3 is equal to the foregoing predetermined time.

The moving direction and the moving distance of the object OB2 in the future are predicted on the assumption that the behavior of the movement of the object OB2 between the timing t1 and the timing t2 is continued at and after the timing t2 as well. In predicting the moving direction, first of all, data (X1, Y1, Z1) existing at a reference position of the object OB2 (e.g., a position of a center of the object OB2) is specified from among point group data LID_OB2 (X, Y, Z, IR) constituting the object OB2 at the timing t1. This specification process is performed for the point group data LID_OB2 (X, Y, Z, IR) at the timing t2 as well. Then, data (X2, Y2, Z2) on the reference position are specified as well.

The moving direction of the object OB2 between the timing t1 and the timing t2 is the same as the orientation of a vector VE that starts at a coordinate (X1, Y1, Z1) and ends at a coordinate (X2, Y2, Z2). In consequence, the moving direction of the object OB2 in the future (i.e., the moving direction of the object OB2 in the data set range DR between the timing t2 and the timing t3) is predicted as the same direction as the orientation of the vector VE.

The moving distance of the object OB2 between the timing t1 and the timing t2 is predicted based on a magnitude |VE| of the vector VE. In concrete terms, the moving distance of the object OB2 in the future (i.e., the moving distance of the object OB2 in the data set range DR between the timing t2 and the timing t3) is predicted through the use of an equation (2) shown below.

$$\text{Moving Distance in Future}=|VE|*(t3-t2)/(t2-t1) \qquad (2)$$

In the abnormality determination process, data on the reflected light intensity IR of the corresponding section PRC in the future are estimated based on the predicted moving direction in the future and the predicted moving distance in the future. In the following description, the reflected light intensity IR in the future will be referred to as "an estimated value IRE" as well.

Figure 5:
FIG. 5 is a view illustrating an example of a method of estimating Z-position data in the future.

An example of a method of estimating the estimated value IRE will be described with reference to FIG. 5. Incidentally, the premise in the description of FIG. 5 is identical to the premise in the description of FIG. 4. Besides, the prediction method described through the use of FIG. 4 is also applied to prediction of the moving direction and the moving distance of the object OB2 in the future that will be described below.

In estimating the estimated value IRE, the corresponding section PRC is first set in the data set range DR at the present timing (i.e., the timing t2). The corresponding section PRC is set as, for example, a unit section where point group data LID constituting the tracking target are predicted to be acquired at a future timing. This unit section is predicted based on the history of the position of the point group data LID constituting the tracking target, and the moving direction of the tracking target in the future.

At the timings t1 and t2 shown in FIG. 5, the point group data LID_OB2 (X, Y, Z, IR) constituting the object OB2 as the tracking target are located in a right region of the data set range DR. Besides, the moving direction of the object OB2 in the future is predicted to be the same as the orientation of the vector VE. It is then understood that the unit section where the point group data LID_OB2 (X, Y, Z, IR) are predicted to be acquired is a unit section located more in the orientation of the vector VE than this right region and the point group data LID_OB2 (X, Y, Z, IR) at the present timing.

When the corresponding section PRC is set, a coordinate (Xp, Yq, Zr) of a position located away from the coordinate (Xi, Yj, Zk) of the position of the center of the corresponding section PRC by the magnitude |VE| in the direction opposite to the orientation of the vector VE is specified. The vector VE and the magnitude |VE| have been described through the use of FIG. 4. In concrete terms, the coordinate (Xp, Yq, Zr) corresponds to an end point of an inverse vector WE of the vector VE that starts at the coordinate (Xi, Yj, Zk).

The coordinate (Xp, Yq, Zr) is specified in the data set range DR at the present timing (i.e., the timing t2). When the coordinate (Xp, Yq, Zr) is specified, a unit section including the coordinate (Xp, Yq, Zr) is specified. The specified unit section will be referred to hereinafter as "a specific section" PRS as well. The specific section PRS is a unit section that is predicted to coincide with the corresponding section PRC in the data set range DR at a future timing. The specific section PRS is also specified in the data set range DR at the present timing.

When the specific section PRS is specified, Z-position data and data on the reflected light intensity IR that constitute arbitrary data LID (X, Y, Z, IR) in the specific section PRS are selected. As the arbitrary data LID (X, Y, Z, IR), data LID (Xp, Yq, Zr, IR) located at the coordinate (Xp, Yq, Zr) in the data set range DR are exemplified. In the case where the data LID (Xp, Yq, Zr, IR) do not exist, the data LID (X, Y, Z, IR) located at a shortest distance from the coordinate (Xp, Yq, Zr) in the data set range DR may be selected.

As described in the description of FIG. 4, the moving direction and the moving distance of the object OB2 in the future are predicted on the assumption that the behavior of the movement of the object OB2 in the data set range DR between the timing t1 and the timing t2 is continued at and after the timing t2 as well. Based on this assumption, this behavior is continued at the timing t3 as well. Then, the Z-position data constituting the arbitrary data LID (X, Y, Z, IR) in the specific section PRS are predicted to be highly correlated with the data on the reflected light intensity IR constituting the data LID (X, Y, Z, IR) included in the corresponding section PRC in the data set range DR at the future timing t3.

A distance DSz between the movable body MB and the object OB2 in the Z-axis direction changes by Vrz*(t3−t2) between the timing t2 and the timing t3. In consequence, an estimated value IRE(t3) at the timing t3 is calculated through the use of an equation (3) shown below.

$$IRE(t3) = IRA(t2) * DSz(t2)^4 / [DSz(t2) - Vrz*(t3-t2)]^4 \qquad (3)$$

In the equation (3), IRA(t2) denotes a value of the data on the reflected light intensity IR constituting the arbitrary data LID (X, Y, Z, IR) in the specific section PRS at the timing t2. DSz(t2) denotes a value of the Z-position data constituting the arbitrary data LID (X, Y, Z, IR) in the specific section PRS at the timing t2.

In the abnormality determination process, the estimated value IRE(t3) and an actual value IRA(t3) are compared with each other. The actual value IRA(t3) is an actual value of the data on the reflected light intensity IR constituting the arbitrary data LID (X, Y, Z, IR) in the specific section PRS at the timing t3. Then, when a difference |IRE(t3)−IRA(t3)| between the estimated value IRE(t3) and the actual value IRA(t3) is higher than a predetermined intensity IRth, it is determined that there is an abnormality in the predetermined section PR.

To summarize the foregoing, according to the embodiment, the abnormality determination process is performed to determine whether or not there is an abnormality in the predetermined section PR of the cover portion 12. In the abnormality determination process, the moving direction and the moving distance of the tracking target in the future in the data set range DR are predicted based on the history of the point group data LID constituting the tracking target.

Besides, in the abnormality determination process, the data (i.e., the estimated value IRE) on the reflected light intensity IR of the corresponding section PRC in the future are estimated based on this moving direction and this moving distance in the future. Then, when the difference |IRE−IRA| between the estimated value IRE and the data (i.e., the actual value IRA) on the actual reflected light intensity IR of the corresponding section PRC is higher than the predetermined intensity IRth, it is determined that there is an abnormality in the predetermined section PR.

According to the embodiment, the abnormality determination process is thus performed. The abnormality determination process makes it possible to detect that there is an abnormality in the predetermined section PR. Accordingly, a fall in the accuracy of the data on the reflection point RP and hence a fall in the accuracy in recognizing an object based on the point group data LID can be detected.

The object recognition system according to the embodiment will be described hereinafter in detail.

2. Object Recognition System 2-1. Configuration Example

Figure 6:
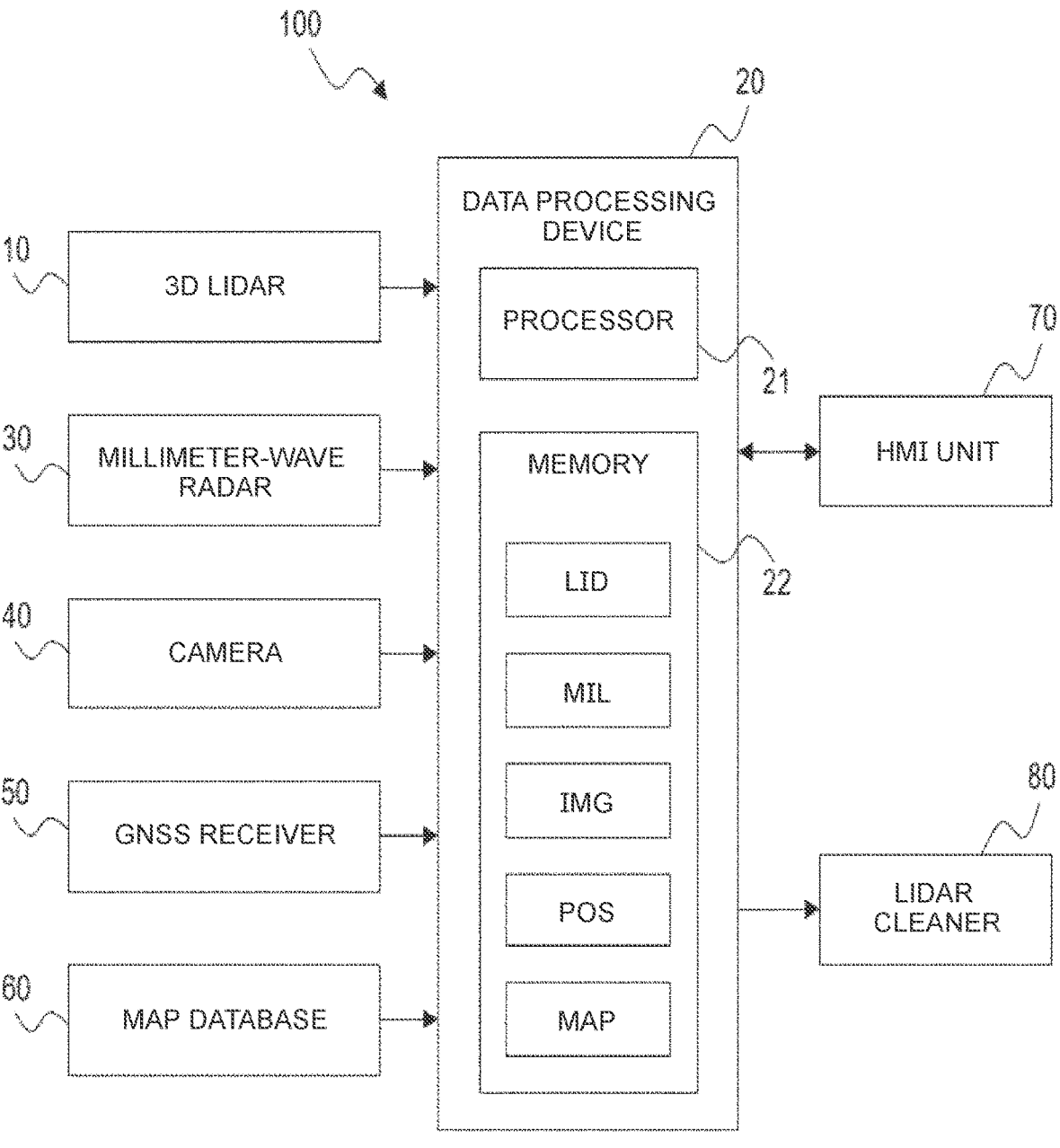
FIG. 6 is a block diagram showing a configuration example of an object recognition system according to one of the embodiments.

FIG. 6 is a block diagram showing a configuration example of the object recognition system according to the embodiment. In the example shown in FIG. 6, an object recognition system 100 is equipped with the 3D LIDAR 10, the data processing device 20, a millimeter-wave radar 30, a camera 40, a global navigation satellite system (GNSS) 50, a map database 60, a human machine interface (HMI) 70, and a LIDAR cleaner 80.

The 3D LIDAR 10 is equipped with the main body portion 11 and the cover portion 12 shown in FIG. 2. The main body portion 11 is equipped with, for example, a light-emitting portion that outputs a laser pulse, a light deflector that causes the laser pulse to scan in the horizontal direction and the vertical direction, an optical system such as a lens, and a light-receiving portion that detects reflected light of the laser pulse. The light-emitting portion is, for example, a laser diode. The peak wavelength of the laser pulse output from the light-emitting portion is not limited in particular. The light deflector is, for example, a micro electro mechanical systems (MEMS) mirror or a polygon mirror. The light-receiving portion is a photodiode.

The 3D LIDAR 10 may be configured to acquire the point group data LID without scanning the laser pulse by the light deflector. As this configuration, a phased array type and a flash type are exemplified. The 3D LIDAR 10 may be configured to acquire the point group data LID by rotationally driving the light-emitting portion and the light-receiving portion mechanically.

The data processing device 20 is configured as a microcomputer that is equipped with at least one processor 21 and at least one memory 22. The processor 21 includes a central processing unit (CPU). The memory 22 is a volatile memory such as a DDR memory. The memory 22 deploys a program used by the processor 21, and temporarily saves various data. The various data include the point group data LID acquired by the 3D LIDAR 10. A functional configuration example of the data processing device 20 will be described later.

The millimeter-wave radar 30 outputs millimeter-wave electromagnetic waves around the movable body MB. When an object around the movable body MB reflects electromagnetic waves, the electromagnetic waves return to the millimeter-wave radar 30. The millimeter-wave radar 30 detects the reflected electromagnetic waves, and generates radar data MIL. As the radar data MIL, data on a distance from the movable body MB (the millimeter-wave radar 30) to the object, data on the direction of the object with respect to the movable body MB, and data on the speed of the object relative to the movable body MB are exemplified. The radar data MTh are stored into the memory 22.

The camera 40 images an area around the movable body MB, and acquires image data IMG. The image data IMG are stored into the memory 22. The camera 40 may process the image data IMG to recognize the object around the movable body MB. As the image data IMG in this case, data indicating an attribute of the recognized object, data on the distance from the movable body MB to the object, data on the direction of the object relative to the movable body MB, and data on a position of the object are exemplified.

The GNSS receiver 50 receives signals from three or more artificial satellites. The GNSS receiver 50 generates position/posture data POS on the movable body MB, based on the received signals. The position/posture data POS are stored into the memory 22.

Map data MAP are stored in the map database 60. As the map data MAP, data on positions of roads, data on road shapes (e.g., whether the roads are curved or straight), and data on positions of intersections and structures are exemplified. The map data MAP include traffic regulation data as well. The map database 60 is formed in a predetermined storage device (e.g., a hard disk or a flash memory) mounted in the movable body MB. The map database 60 may be formed in a computer in a facility that can communicate with the movable body MB.

The HMI unit 70 exchanges various pieces of information with a driver of the movable body MB. The HMI unit 70 is equipped with, for example, an input device (e.g., a manipulation button or a touch panel), a display device, and an audio output device. The HMI unit 70 transmits information input from the driver via the input device to the data processing device 20. The HMI unit 70 provides information to the driver based on a control signal from the data processing device 20. The information provided to the driver includes attention-seeking information. The attention-seeking information includes information indicating that there is an abnormality in the cover portion 12.

The LIDAR cleaner 80 removes the dirt that has adhered to the cover portion 12. The LIDAR cleaner 80 is provided close to the cover portion 12. The LIDAR cleaner 80 is, for example, a spray that injects cleaning liquid or air onto the cover portion 12. In the case where the LIDAR cleaner 80 is a spray, two or more spray cans may be provided. In this case, the two or more spray cans are provided in such a manner as to correspond to relevant ranges set in the scan range SR respectively. The LIDAR cleaner 80 is driven based on, for example, a control signal INS from the data processing device 20.

2-2. Functional Configuration Example of Data Processing Device

Figure 7:
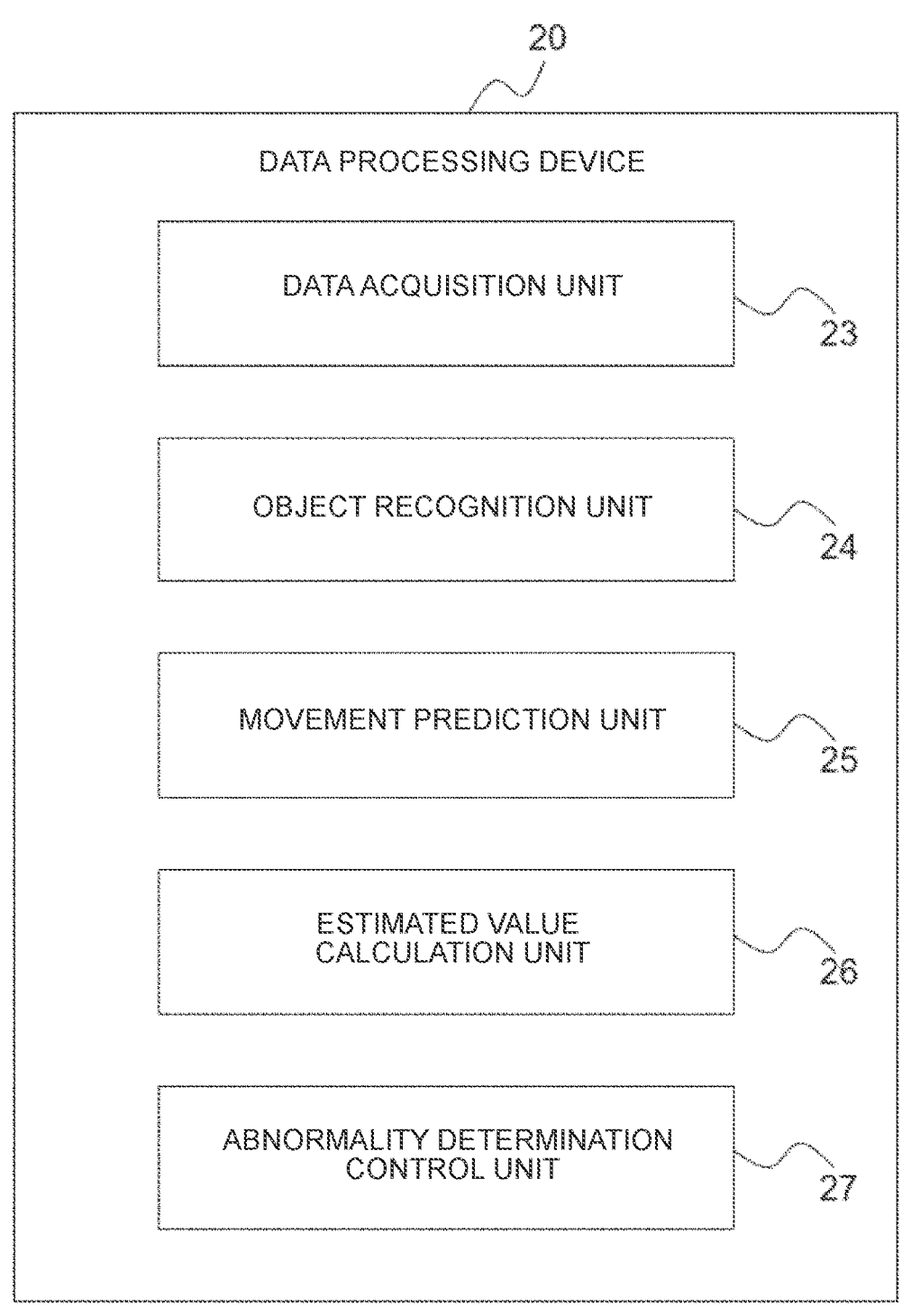
FIG. 7 is a block diagram showing a functional configuration example of a data processing device.

FIG. 7 is a block diagram showing a functional configuration example of the data processing device 20. In the example shown in FIG. 7, the data processing device 20 is equipped with a data acquisition unit 23, an object recognition unit 24, a movement prediction unit 25, an estimated value calculation unit 26, and an abnormality determination control unit 27. These functions are realized through the processing of a predetermined program stored in the memory 22 by the processor 21.

The data acquisition unit 23 acquires data required for various processes performed by the data processing device 20. As the various processes, an object recognition process, a tracking process, and an abnormality determination process are exemplified. As the data required for the various processes, the point group data LID, the radar data MIL, the image data IMG, the position/posture data POS, and the map data MAP are exemplified.

The object recognition unit 24 performs the object recognition process based on the point group data LID acquired by the data acquisition unit 23. In the object recognition process, an object as a tracking target is recognized. The object is recognized through a clustering process. The method of recognizing the object including the clustering process is not limited in particular, and a known technology can be applied. The object recognition unit 24 transmits data on the tracking target to a tracking unit 25.

In the object recognition process, the point group data LID may be fused with other data. As a first example of other data, the position/posture data POS and the map data MAP are cited. By integrating these data with the point group data LID, a stationary object around the movable body MB is recognized as the tracking target. As a second example of other data, the radar data MIL or the image data IMG are exemplified. By integrating the radar data MIL or the image data IMG with the point group data LID, the movable body around the movable body MB is recognized as the tracking target.

Figure 8:
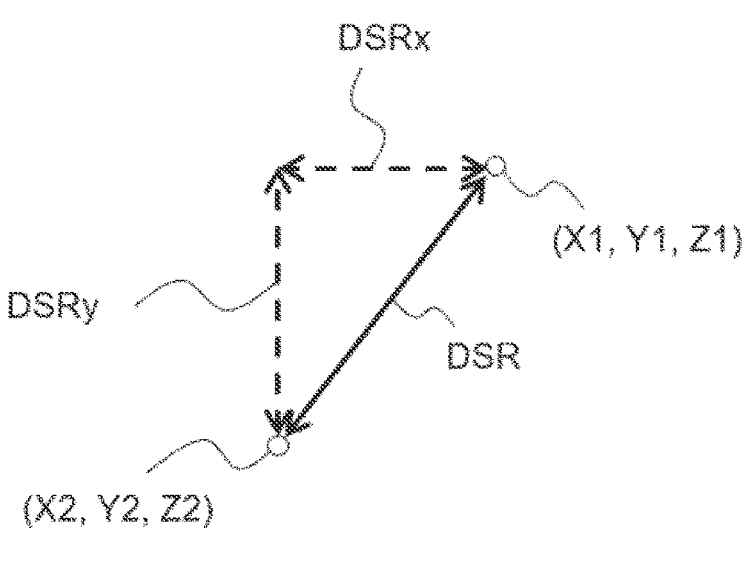
FIG. 8 is a view showing an example of the moving direction and the moving distance of the tracking target in the future.
Figure 8:
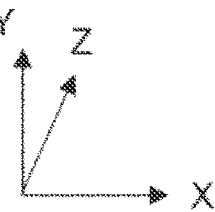

The movement prediction unit 25 predicts a moving direction and a moving distance of the tracking target in the future, based on a history of the point group data LID constituting the tracking target. FIG. 8 is a view showing an example of the moving direction and the moving distance in the future. The coordinates (X1, Y1, Z1) and (X2, Y2, Z2) shown in FIG. 8 are coordinates of a reference position in the point group data LID_OB2 (X, Y, Z, IR) described with reference to FIG. 4.

The movement prediction unit 25 calculates an orientation of the vector VE that starts at the coordinate (X1, Y1, Z1) and ends at the coordinate (X2, Y2, Z2). The orientation of the vector VE is the moving direction in the future. The movement prediction unit 25 transmits data indicating the orientation of the vector VE to the estimated value calculation unit 26. Besides, the movement prediction unit 25 calculates the magnitude |VE| of the vector VE. The magnitude |VE| is equal to a distance DSR from the coordinate (X1, Y1, Z1) to the coordinate (X2, Y2, Z2) in the data set range DR.

The movement prediction unit 25 further calculates a component of the distance DSR in the X-axis direction and a component of the distance DSR in the Y-axis direction. As described already, the Y-axis is perpendicular to the Z-axis (the output central axis of the laser pulse), and is parallel to the vertical direction. Therefore, the component in the Y-axis direction will be referred to hereinafter as "a vertical distance DSRy" as well. Besides, the X-axis is perpendicular to the Z-axis and the Y-axis, and is parallel to the horizontal direction. Therefore, the component in the X-axis direction will be referred to hereinafter as "a horizontal distance DSRx" as well. The movement prediction unit 25 transmits data on the vertical distance DSRy and the horizontal distance DSRx to the estimated value calculation unit 26.

The estimated value calculation unit 26 calculates the estimated value IRE of the corresponding section PRC at a future timing. First of all, the estimated value calculation unit 26 sets the corresponding section PRC in the data set range DR at the present timing. The corresponding section PRC is set as a unit section in which the point group data LID constituting the tracking target are predicted to be acquired at the future timing. This unit section is predicted based on the history of the position of the point group data LID constituting the tracking target and the moving direction of the tracking target in the future.

The corresponding section PRC is desired to be set outside a unit section in which the point group data LID constituting an outer edge portion of the tracking target are predicted to be acquired. This is because the point group data LID constituting the outer edge portion may include 3D position data on an object other than the tracking target. Accordingly, the corresponding section PRC is desired to be set as a unit section that is predicted to be located inside the outer edge portion.

After the corresponding section PRC is set, the estimated value calculation unit 26 specifies the coordinate (Xi, Yj, Zk) of the position of the center of the corresponding section PRC. The estimated value calculation unit 26 then specifies the coordinate (Xp, Yq, Zr) based on the coordinate (Xi, Yj, Zk) and the data on the moving direction and the moving distance of the tracking target in the future. As described already, the coordinate (Xp, Yq, Zr) is a coordinate located away from the coordinate (Xi, Yj, Zk) by |VE| in the direction opposite to the orientation of the vector VE.

After the coordinate (Xp, Yq, Zr) is specified, the estimated value calculation unit 26 specifies the unit section (i.e., the specific section) including the coordinate (Xp, Yq, Zr). As described already, the specific section is a unit section that is predicted to coincide with the corresponding section PRC in the data set range DR at the future timing. It has also been described already that the coordinate (Xp, Yq, Zr) and the specific section PRS are specified in the data set range DR at the present timing.

After the specific section PRS is specified, the estimated value calculation unit 26 selects the Z-position data constituting arbitrary data LID (X, Y, Z, IR) in the specific section PRS and the data on the reflected light intensity IR. The example of the arbitrary data LID (X, Y, Z, IR) has already been described.

In selecting the data on the reflected light intensity IR, the estimated value calculation unit 26 is desired to evaluate the selected data on the reflected light intensity IR. This is because the selected data on the reflected light intensity IR may be data on a singular point that significantly deviate from the data on the reflected light intensity IR therearound. It is evaluated whether or not the data on the reflected light intensity IR are the data on the singular point, based on a comparison with an average AIR of the data on the reflected light intensity IR constituting all the data LID (X, Y, Z, IR) in the specific section PRS. When the difference between the selected data on the reflected light intensity IR and the average AIR is larger than a predetermined deviation AIRth, it is determined that the data are the data on the singular point. In this case, the data on the reflected light intensity IR are discarded, and the data on the reflected light intensity IR constituting other data LID (X, Y, Z, IR) in the specific section PRS are selected.

After the Z-position data and the data on the reflected light intensity IR are selected, the estimated value calculation unit 26 calculates the estimated value IRE. The estimated value IRE is calculated based on a value of the selected data on the reflected light intensity IR at the present timing (i.e., the actual value IRA) and a value of the selected Z-position data at the present timing (i.e., the distance DSz between the movable body MB and the tracking target), and an amount of change in the Z-position data from the present timing to the future timing (i.e., an amount of change ΔDSz in the distance DSz). An equation for calculating the estimated value IRE is expressed as an equation (4) shown below that is obtained by transforming the equation (3).

$$IRE = IRA*DSz^4/[DSz - Vrz*\Delta DSz]^4 \tag{4}$$

The estimated value calculation unit 26 transmits the data on the estimated value IRE to the abnormality determination control unit 27.

The abnormality determination control unit 27 determines whether or not there is an abnormality in the predetermined section PR. This determination is made based on a comparison between the estimated value IRE and the actual value IRA acquired with the lapse of time. The actual value IRA corresponds to the data on the reflected light intensity IR constituting the data LID (X, Y, Z, IR) in the specific section PRS selected by the estimated value calculation unit 26.

When the difference |IRE−IRA| between the estimated value IRE and the actual value IRA is higher than the predetermined intensity IRth, the abnormality determination control unit 27 determines that there is an abnormality in the predetermined section PR. Otherwise, it is determined that the predetermined section PR is normal. The abnormality determination control unit 27 counts the number of times NJ of the determination that there is an abnormality in the predetermined section PR. Then, when it is determined that the number of times NJ of this determination is larger than the predetermined number of times Nth, the abnormality determination control unit 27 outputs the control signal INS to the LIDAR cleaner 80.

When it is determined again that the number of times NJ of the determination is larger than the predetermined number of times Nth after the control signal INS is output to the LIDAR cleaner 80, the abnormality determination control unit 27 may output the control signal INS to the HMI unit 70. In the case where the cause of the abnormality in the predetermined section PR is dirt, this cause is eliminated by driving the LIDAR cleaner 80 based on the control signal INS. On the other hand, in the case where the cause of the abnormality is a scar, this cause may not be eliminated even by driving the LIDAR cleaner 80. In this respect, the attention-seeking information is provided to the driver by outputting the control signal INS to the HMI unit 70. Thus, the driver can be urged to, for example, mend the scar.

2-3. Example of Abnormality Determination Process

Figure 9:
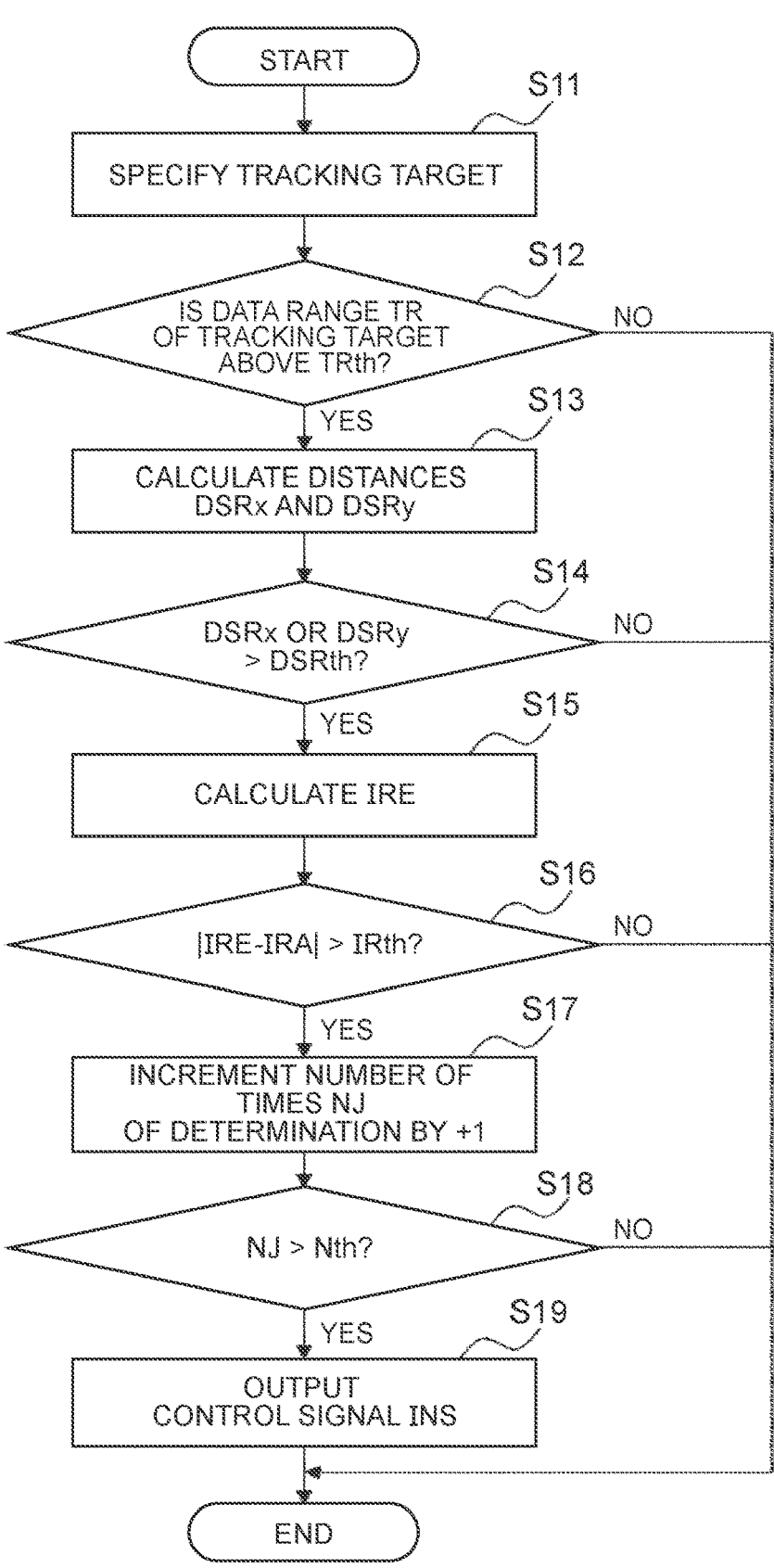
FIG. 9 is a flowchart showing the flow of an abnormality determination process that is performed by the data processing device (a processor).

FIG. 9 is a flowchart showing the flow of the abnormality determination process that is performed by the data processing device 20 (the processor 21). A routine shown in FIG. 9 is repeatedly executed on a predetermined control cycle.

In the routine shown in FIG. 9, a tracking target is first specified (step S11). The tracking target is specified from among objects recognized through the object recognition process that is performed separately.

Subsequently to the processing of step S11, it is determined whether or not a data range TR of the point group data LID constituting the tracking target exceeds a predetermined range TRth (step S12). The data range TR is calculated by, for example, linking unit sections in which the point group data LID constituting the outer edge portion of the tracking target are located, in the data set range DR. When the data range TR does not exceed the predetermined range TRth, it is determined that the tracking target specified in the processing of step S11 is not suitable for the abnormality determination process. In this case, the abnormality determination process is ended.

When the result of the determination in step S12 is positive, the horizontal distance DSRx and the vertical distance DSRy are calculated (step S13). The horizontal distance DSRx and the vertical distance DSRy are calculated based on the moving direction and the moving distance of the tracking target in the future. The horizontal distance DSRx and the vertical distance DSRy have been described with reference to FIG. 8.

Subsequently to the processing of step S13, it is determined whether or not the horizontal distance DSRx or the vertical distance DSRy is equal to or longer than a predetermined distance DSRth (step S14). When the horizontal distance DSRx or the vertical distance DSRy is short, the same unit section may be compared at the present timing and the future timing. In this case, the data ranges of the corresponding section PRC and the specific section PRS overlap with each other, so the data on the reflected light intensity IR that are different in reflection characteristics from each other may be compared with each other. Then, the accuracy in determining whether or not there is an abnormality may fall.

Thus, when the horizontal distance DSRx or the vertical distance DSRy is equal to or shorter than the predetermined distance DSRth, it is determined that the tracking target specified in the processing of step S11 is not suitable for the abnormality determination process. In this case, the abnormality determination process is ended.

When the result of the determination in step S14 is positive, the estimated value IRE is calculated (step S15). The estimated value IRE is calculated based on the equation (4).

Subsequently to the processing of step S15, it is determined whether or not the difference |IRE−IRA| is higher than the predetermined intensity IRth (step S16). When the result of the determination in step S16 is positive, the number of times NJ of determination is incremented (NJ=NJ+1) (step S17). The number of times NJ of determination is incremented individually for the predetermined section PR. When the result of the determination in step S16 is negative, the number of times NJ of determination is reset, and the abnormality determination process is ended.

Subsequently to the processing of step S17, it is determined whether or not the number of times NJ of determination is larger than the predetermined number of times NJth (step S18). When the result of the determination in step S18 is positive, the control signal INS is output to the LIDAR cleaner 80 (step S19). After the control signal INS is output, the number of times NJ of determination is reset, and the abnormality determination process is ended.

3. Effect

According to the embodiment described above, the abnormality determination process is performed. The abnormality determination process makes it possible to detect that there is an abnormality in the predetermined section PR, based on the history of the point group data LID constituting the tracking target. Accordingly, a fall in the accuracy of the data on the reflection point RP and hence a fall in the accuracy in recognizing the object based on the point group data LID can be detected.

What is claimed is:

1. An object recognition system that recognizes an object around a movable body, the object recognition system comprising:

a main body portion of a laser imaging detection and ranging that outputs a laser pulse to an area around the movable body and that acquires data on a reflection point around the movable body by detecting reflected light of the laser pulse reflected at the reflection point;

a cover surface that protects the main body portion; and a data processing device that performs an object recognition process based on point group data obtained by processing the data on the reflection point, wherein the cover surface includes a scan range indicating a range that is passed by the laser pulse and the reflected light, the data processing device further performs an abnormality determination process for determining whether or not there is an abnormality in a predetermined section of the scan range, the data processing device predicts a relative moving distance indicating a distance by which a tracking target recognized through the object recognition process moves relatively to the movable body, in a range of a data set for expressing the point group data until lapse of a predetermined time from a present timing, based on a history of the point group data, in the abnormality determination process, the relative moving distance includes a vertical distance indicating a component that is perpendicular to an output central axis of the laser pulse and that is parallel to a vertical direction, and a horizontal distance indicating a component that is perpendicular to the output central axis and that is parallel to a horizontal direction, the data processing device calculates an estimated intensity of the reflected light based on a history of point group data constituting the tracking target, when the vertical distance or the horizontal distance is equal to or longer than a predetermined distance, in the abnormality determination process, the estimated intensity is an intensity of the reflected light that is predicted to constitute the point group data on the tracking target, in the range of the data set after lapse of the predetermined time and in a corresponding section indicating a section corresponding to the predetermined section, the data processing device determines whether or not a difference between the estimated intensity and an actual intensity of the reflected light is higher than a predetermined intensity, in the abnormality determination process, the actual intensity is an intensity of the reflected light that actually constitutes the point group data on the tracking target, in the range of the data set after lapse of the predetermined time and in the corresponding section, and the data processing device determines that there is an abnormality in the predetermined section when it is determined that the difference between the estimated intensity and the actual intensity is higher than the predetermined intensity, in the abnormality determination process;

wherein the data processing device further performs a process of specifying a specific section indicating a section that is predicted to coincide with the corresponding section in the range of the data set after lapse of the predetermined time, in the range of the data set at the present timing, and a process of selecting data on an arbitrary coordinate in the specific section and evaluating an intensity of the reflected light constituting the arbitrary data, in the abnormality determination process, and the data processing device calculates an average of intensities of the reflected light respectively constituting all the data on coordinates in the specific section, determines whether or not a difference between the average and the intensity of the reflected light constituting the selected arbitrary data is larger than a predetermined deviation, and selects data on an arbitrary coordinate in the specific section other than the previously selected coordinate when it is determined that the difference between the average and the intensity of the reflected light constituting the selected arbitrary data is larger than the predetermined deviation, in the process of evaluating the intensity of the reflected light.

2. The object recognition system according to claim 1, wherein the data processing device further performs a process of setting the corresponding section based on the history of the point group data constituting the tracking target, in the abnormality determination process, and the data processing device sets the corresponding section as a section inside a section that is predicted to constitute point group data on an outer edge portion of the tracking target, in the range of the data set after lapse of the predetermined time, in the process of setting the corresponding section.

3. The object recognition system of claim 1, wherein the data processing device determines if a number of times that the determination is larger is greater than a predetermined number of times, and if the number of times is greater, outputs a control signal to a LIDAR cleaner.

4. The object recognition system of claim 3, wherein if the data processing device determines again that the number of times that the determination is larger is greater than the predetermined number of times, the data processing device outputs a control signal to a human machine interface.

5. The object recognition system of claim 1, wherein the estimated intensity is calculated by the following equation:

$$IRE=IRA*DSz^4/[DSz-Vrz*\Delta DSz]^4$$

wherein:

IRE is the estimated intensity

IRA is the actual intensity

DSz is a distance between the movable body and the tracking target, and

Vrz is a relative velocity between the movable body and the tracking target.

6. An object recognition method for recognizing an object around a movable body, wherein a data processing device that performs an object recognition process based on data on a reflection point around the movable body that are acquired by detecting reflected light of a laser pulse reflected at the reflection point performs an abnormality determination process for determining whether or not there is an abnormality in a predetermined section of a scan range indicating a range that is passed by the laser pulse and the reflected light, on a cover surface that protects a main body portion of a laser imaging detection and ranging that outputs the laser pulse, that detects the reflected light, and that acquires the data on the reflection point, the data processing device predicts a relative moving distance indicating a distance by which a tracking target recognized through the object recognition process moves relatively to the movable body, in a range of a data set for expressing the point group data until lapse of a predetermined time from a present timing, based on a history of the point group data, in the abnormality determination process, the relative moving distance includes a vertical distance indicating a component that is perpendicular to an output central axis of the laser pulse and that is parallel to a vertical direction, and a horizontal distance indicating a component that is perpendicular to the output central axis and that is parallel to a horizontal direction, the data processing device calculates an estimated intensity of the reflected light based on a history of point group data constituting the tracking target, when the vertical distance or the horizontal distance is equal to or longer than a predetermined distance, in the abnormality determination process, the estimated intensity is an intensity of the reflected light that is predicted to constitute the point group data on the tracking target, in the range of the data set after lapse of the predetermined time and in a corresponding section indicating a section corresponding to the predetermined section, the data processing device determines whether or not a difference between the estimated intensity and an actual intensity of the reflected light is higher than a predetermined intensity, in the abnormality determination process, the actual intensity is an intensity of the reflected light that actually constitutes the point group data on the tracking target, in the range of the data set after lapse of the predetermined time and in the corresponding section, and the data processing device determines that there is an abnormality in the predetermined section when it is determined that the difference between the estimated intensity and the actual intensity is higher than the predetermined intensity, in the abnormality determination process;

wherein the data processing device further performs a process of specifying a specific section indicating a section that is predicted to coincide with the corresponding section in the range of the data set after lapse of the predetermined time, in the range of the data set at the present timing, and a process of selecting data on an arbitrary coordinate in the specific section and evaluating an intensity of the reflected light constituting the arbitrary data, in the abnormality determination process, and the data processing device calculates an average of intensities of the reflected light respectively constituting all the data on coordinates in the specific section, determines whether or not a difference between the average and the intensity of the reflected light constituting the selected arbitrary data is larger than a predetermined deviation, and selects data on an arbitrary coordinate in the specific section other than the previously selected coordinate when it is determined that the difference between the average and the intensity of the reflected light constituting the selected arbitrary data is larger than the predetermined deviation, in the process of evaluating the intensity of the reflected light.

* * * * *